United States Patent
Takagi et al.

(10) Patent No.: US 7,555,767 B2
(45) Date of Patent: Jun. 30, 2009

(54) TV PROGRAM DISTRIBUTION SYSTEM AND TV BROADCAST SIGNAL RECEIVING DEVICE FOR RECEIVING A PAY TV PROGRAM DISTRIBUTED FROM THE SYSTEM

(75) Inventors: Toshihiro Takagi, Daito (JP); Masanori Kawai, Daito (JP); Naoki Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 639 days.

(21) Appl. No.: 11/125,150

(22) Filed: May 10, 2005

(65) Prior Publication Data

US 2005/0273803 A1    Dec. 8, 2005

(30) Foreign Application Priority Data

May 11, 2004    (JP)    ............................. 2004-140887

(51) Int. Cl.
*H04N 7/16*    (2006.01)
*H04N 7/173*    (2006.01)
*G06Q 30/00*    (2006.01)
*G07G 1/14*    (2006.01)
*G06F 17/00*    (2006.01)

(52) U.S. Cl. .............................. 725/23; 725/24; 725/87; 725/104; 705/14; 705/26; 705/400

(58) Field of Classification Search .................... 725/23, 725/24, 87, 104; 705/14, 26, 400
See application file for complete search history.

(56) References Cited

U.S. PATENT DOCUMENTS 7,194,427 B1 *    3/2007    Van Horn et al. .............. 705/26
7,310,610 B2 *    12/2007    Fujita et al. .................... 705/26

(Continued)

FOREIGN PATENT DOCUMENTS

JP    9-9241 A    1/1997

(Continued)

OTHER PUBLICATIONS

Japanese Office Action dated Aug. 26, 2008 w/English translation (four (4) pages).

*Primary Examiner*—Christopher Kelley
*Assistant Examiner*—Franklin S Andramuno
(74) *Attorney, Agent, or Firm*—Crowell & Moring LLP

(57) ABSTRACT

A TV program distribution system comprises: a TV broadcast signal distribution device for distributing a scrambled pay TV program provided by a TV program provider; an auction management device for managing selling, by auction, of the viewing right of the pay TV program; an account management device for charging winning bidders of the pay TV program determined by the auction; and a conditional access management device for managing conditional access information to make it possible for each STB of each winning bidder of the pay TV program to descramble the scrambled pay TV program.

The TV program distribute system sells the pay TV program by auction, limiting the number of STBs allowed to access the pay TV program, so that the TV program distribution system makes it possible for the TV program provider to collect fees of the pay TV program according to market value of the pay TV program.

7 Claims, 8 Drawing Sheets

U.S. PATENT DOCUMENTS

| | | |
|---|---|---|
| 2002/0092024 A1* | 7/2002 | Nagaoka et al. ............... 725/62 |
| 2003/0115597 A1* | 6/2003 | Yassin et al. .................. 725/36 |
| 2006/0069635 A1* | 3/2006 | Ram et al. .................... 705/37 |

FOREIGN PATENT DOCUMENTS

| | | |
|---|---|---|
| JP | 10-320470 A | 12/1998 |
| JP | 2000-503789 A | 3/2000 |
| JP | 2002-157368 | 5/2002 |
| JP | 2002-312633 A | 10/2002 |
| JP | 2002-344931 A | 11/2002 |
| JP | 2002-354454 | 12/2002 |
| WO | WO 97/37315 A1 | 10/1997 |

* cited by examiner

TV PROGRAM DISTRIBUTION SYSTEM AND TV BROADCAST SIGNAL RECEIVING DEVICE FOR RECEIVING A PAY TV PROGRAM DISTRIBUTED FROM THE SYSTEM

BACKGROUND OF THE INVENTION

1. Field of the Invention

The present invention relates to a TV program distribution system for distributing a pay TV program and to a TV broadcast signal receiving device for receiving the pay TV program distributed from the TV program distribution system.

2. Description of the Related Art

In a TV (television) program distribution system for distributing pay TV programs, it is known to adopt a conditional access system (CAS). The conditional access system is a system such that TV broadcast signals of certain TV programs are scrambled, and that only viewers with a pay or viewing contract can descramble the scrambled signals for TV program viewing.

Among pay TV programs provided by TV program providers, there exists a TV program that would not be necessarily required to be distributed to many viewers, and that could maintain a high market value by limiting the number of viewers that can watch or access the TV program. However, in a conventional TV program distribution system, viewers who wish to watch a pay TV program can watch the TV program without limitation in the number of viewers after they enter a viewing contract with the TV program provider. Accordingly, a TV program provider providing such pay TV program as described above cannot necessarily obtain a sufficient profit according to its market value.

On the other hand, as a system for distributing e.g. a TV program, there is known a system such that e.g. a producer of the TV program sells the TV program to customers by distributing the content of the TV program via a communication line (refer to e.g. Japanese Laid-open Patent Publication 2002-354454). There is also known a system such as to distribute a TV program by using a license ID (identification) which is required for recording or reproducing the TV program (refer to e.g. Japanese Laid-open Patent Publication 2002-157368).

In the market of tangible goods, a so-called auction system is known as a method of selling a product at a price according to market value, in which the product is sold to a buyer who bids the highest price among participating buyers. However, in the market of intangible goods such as TV programs, in which a product having the same content can be distributed to unspecified number of viewers simultaneously, an auction system is not being used for selling.

SUMMARY OF THE INVENTION

An object of the present invention is to provide such a pay TV program distribution system that can collect fees according to market value of a pay TV program by limiting the number of viewers that can watch or access the pay TV program.

A further object of the present invention is to provide such a TV broadcast signal receiving device that can receive the pay TV program distributed from the pay TV program distribution system.

According to a first aspect of the present invention, the above object is achieved by a TV program distribution system for distributing a pay TV program provided by a TV program provider to TV broadcast signal receiving devices, limiting number of TV broadcast signal receiving devices allowed to access the pay TV program.

For selling viewing right of the pay TV program by auction, the TV program distribution system notifies auction TV program information, including information on an outline of the pay TV program, predetermined number of TV broadcast signal receiving devices allowed to access the pay TV program, auction period and predetermined minimum bid price, to unspecified number of TV broadcast signal receiving devices prior to the distribution of the pay TV program.

When number of bidders in the auction period is within the predetermined number of TV broadcast signal receiving devices allowed to access the pay TV program, the TV program distribution system distributes the pay TV program to all the bidders at the minimum bid price.

When the number of bidders in the auction period exceeds the predetermined number of TV broadcast signal receiving devices allowed to access the pay TV program, the TV program distribution system determines that the number of bidders, which corresponds to the predetermined number of TV broadcast signal receiving devices allowed to access the pay TV program, and which is chosen in order from the highest bid price, are winning bidders, in which the TV program distribution system distributes the pay TV program to all the winning bidders at the lowest bid price among bid prices of all the winning bidders.

According to a second aspect of the present invention, the above object is achieved by a TV program distribution system for distributing a pay TV program provided by a TV program provider to TV broadcast signal receiving devices, limiting number of TV broadcast signal receiving devices allowed to access the pay TV program, the TV program distribution system comprising: a TV broadcast signal distribution device for scrambling the pay TV program, and for multiplexing the pay TV program with other information into DTV broadcast signals for distribution; an auction management device for managing selling, by auction, of viewing right of the pay TV program; an account management device for charging winning bidders of the pay TV program determined by the auction; and a conditional access management device for managing conditional access information to make it possible for each TV broadcast receiving device of each winning bidder of the pay TV program to descramble the scrambled pay TV program.

The TV broadcast signal distribution device distributes auction TV program information including information on an outline of the pay TV program, predetermined number of TV broadcast signal receiving devices allowed to access the pay TV program, auction period and predetermined minimum bid price, prior to the distribution of the pay TV program.

The auction management device receives a user ID for identifying the user of the TV broadcast signal receiving device and bid information including information on a bid price, which are sent from each TV broadcast signal receiving device, and further sums up received plural bid information so as to determine winning bidders and a winning bid price of the pay TV program.

When the winning bidders of the pay TV program are determined, the TV broadcast signal distribution device distributes, to each winning bidder of the pay TV program, the conditional access information of the pay TV program managed by the conditional access management device.

According to the TV program distribution system of the present invention in any of the first and second aspects, it is possible to sell the pay TV program while maintaining a high market value of the pay TV program by limiting the number of viewers that can watch or access the TV program. Furthermore, since the pay TV program is sold by auction, the TV program provider can collect fees according the market value of the pay TV program.

According to a third aspect of the present invention, the above further object is achieved by a TV broadcast signal receiving device for receiving a pay TV program which is distributed from a TV program distribution system, and viewing right of which is sold by auction, the TV broadcast signal receiving device comprising: a receiving circuit for receiving a scrambled pay TV program with other information as DTV broadcast signals; a descrambler unit for descrambling the scrambled pay TV program received by the receiving circuit; a decoder unit for decoding video and audio signals of the pay TV program descrambled by the descrambler unit; an output circuit for outputting, to a display device, the video and audio signals decoded by the decoder unit; an information input device for inputting predetermined information to be sent from the TV broadcast signal receiving device to the TV program distribution system; and a sending circuit for sending, to the TV program distribution system, the information input using the information input device.

The receiving circuit receives auction TV program information which is distributed from the TV broadcast signal distribution device prior to the distribution of the pay TV program, and which includes information on an outline of the pay TV program, predetermined number of TV broadcast signal receiving devices allowed to access the pay TV program, auction period and predetermined minimum bid price.

The output circuit outputs the received auction TV program information to the display device.

When a bid price of the pay TV program is input using the information input device, the sending circuit sends, to the TV program distribution system, a user ID for identifying the user of the TV broadcast receiving device and bid information including information on the bid price.

When the TV broadcast signal receiving device wins the bid for the viewing right of the pay TV program, the receiving circuit receives conditional access information for descrambling the scrambled pay TV program.

Using the received conditional access information, the descrambler unit descrambles the scrambled pay TV program.

According to the TV broadcast signal receiving device of the present invention, a user of a TV broadcast signal receiving device wishing to view a pay TV program, which is limited in the number of TV broadcast signal receiving devices allowed to access thereto, can participate and bid in the auction of the pay TV program, using the TV broadcast signal receiving device. Accordingly, the user can establish a viewing contract with the TV program provider at a price according to the extent that the user wishes to view.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2A is a table showing content of auction TV program information, while

FIG. 3A is a table showing content of auction information, while

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiments.

Figure 1:
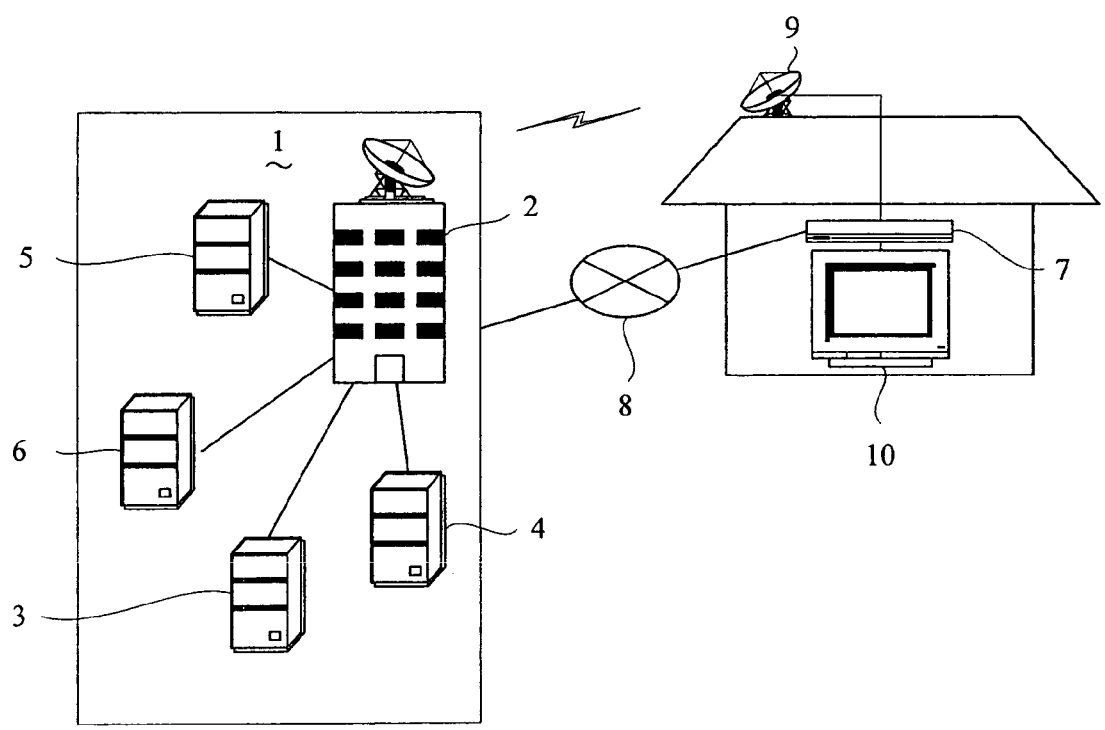
FIG. 1 is a schematic diagram showing a TV program distribution system according to an embodiment of the present invention.

FIG. 1 is a schematic diagram showing a TV (television) program distribution system 1 according to an embodiment of the present invention. The TV program distribution system 1 is a system for distributing a pay TV program, provided by a TV program provider, to TV broadcast signal receiving devices (STBs described later) in a manner to limit the number of viewers that can watch or access the pay TV program by limiting the number of TV broadcast signal receiving devices (STBs) allowed to access the pay TV program. As shown in FIG. 1, the TV program distribution system 1 comprises: a TV broadcast signal distribution device 2 for scrambling a pay TV program, and for multiplexing the pay TV program with other information into DTV (Digital Television) broadcast signals for distribution; an auction management device 3 for managing selling, by auction, of the right of viewing the pay TV program, namely viewing right of the pay TV program; an account management device 4 for charging winning bidders of the pay TV program determined by the auction; a conditional access management device 5 for managing conditional access information to make it possible that each TV broadcast receiving device such as STB (Set Top Box) 7 of each winning bidder of the pay TV program descrambles the scrambled pay TV program; and a TV program management device 6 for managing TV programs to be distributed from the TV broadcast signal distribution device 2.

The TV program distribution system 1 is connected via a communication line 8 to the STB 7 installed at each end user site. The STB 7 receives TV broadcast signals via an antenna 9, and decodes the TV broadcast signals into video and audio signals for output to a monitor device (display device) 10. Each STB 7, or more specifically, a user or viewer of each STB 7 can bid in the auction for the pay TV program, so that each STB 7 connected via the communication line 8 to the TV program distribution system 1 or the user or viewer of each such STB 7 can be referred to as a bidder, and that the number of such STBs 7 connected via the communication line 8 to the TV program distribution system 1 is or can be the maximum number of bidders.

The TV broadcast signal distribution device 2 encodes and multiplexes information sources registered in the TV program management device 6 such as images, sounds and data of the TV programs, and distributes the encoded and multiplexed information sources via broadcast transmission media such as terrestrial broadcast, satellite broadcast, cable television broadcast and internet broadcast. Further, the TV broadcast signal distribution device 2 scrambles pay TV programs for distribution as described above.

Furthermore, prior to the distribution of each auction TV program, i.e. a pay TV program to be auctioned, the TV broadcast signal distribution device 2 distributes and thereby notifies, to unspecified number of STBs 7 or viewers, the auction TV program information which includes information on an outline of the pay TV program, predetermined number of STBs 7 or number of viewers allowed to access the pay TV program, auction period and predetermined minimum bid price set e.g. by the TV program provider. During the auction period, the TV broadcast signal distribution device 2 distributes auction information including information on the auction TV program and bid information already received by the auction management device 3.

In addition, after the end of the auction, the TV broadcast signal distribution device 2 distributes winning bid information including information on winning bidders and a winning bid price of the pay TV program. Note that details of the auction TV program, the auction information and the winning bid information will be described later. When the winning bidders of the pay TV program are determined, the TV broadcast signal distribution device 2 distributes, to each winning bidder of the pay TV program, the conditional access information of the pay TV program managed by the conditional access management device 5.

Figure 2A:
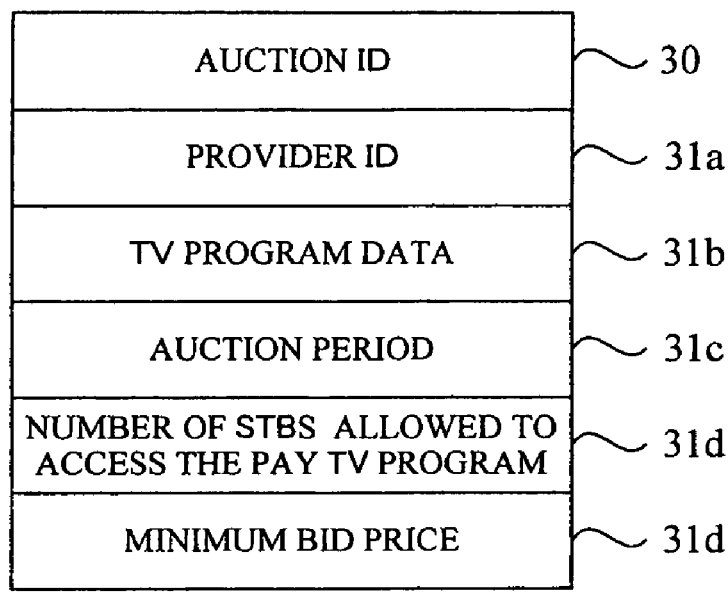

The auction management device 3 manages the information on the auction TV program, i.e. a pay TV program to be auctioned. FIG. 2A is a table showing content of auction TV program information 31, namely information on the pay TV program for auction. As shown in FIG. 2A, the auction TV program information 31 includes: an auction ID (identification) 30 for identifying the pay TV program to be auctioned; provider ID 31a of the TV program provider; TV program data 31b of information on the outline of the TV program to be distributed; auction period 31c; number 31d of STBs 7 (viewers) allowed to access the pay TV program; and minimum bid price 31e. Note that the minimum bid price 31e is a minimum price that the TV program provider sets and requires each viewer to pay for accessing or viewing the pay TV program.

Figure 2B:
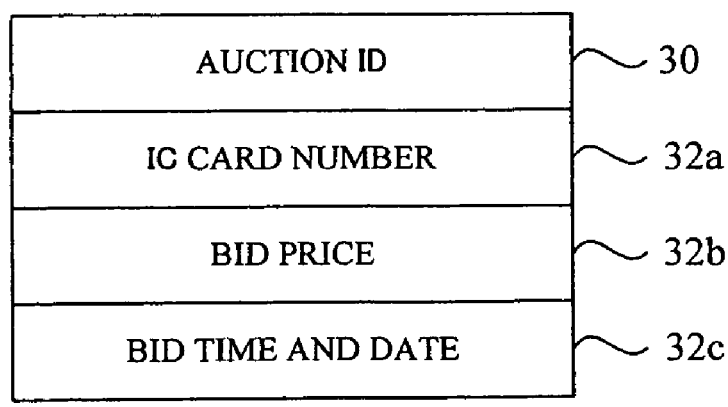
FIG. 2B is a table showing content of bid information.

The auction management device 3 receives a user ID (Identification), sent from each STB 7, for identifying the user of the STB 7, and further receives bid information including information on a bid price also sent from each STB 7. Furthermore, the auction management device 3 manages and sums up plural bid information which it receives from the STBs 7, so as to determine winning bidders and a winning bid price of the pay TV program. FIG. 2B is a table showing content of bid information 32. As shown in FIG. 2B, the bid information 32, which is sent from the STB 7, includes: an auction ID 30; IC (Integrated Circuit) card number 32a specific to each STB 7; a bid price 32b input by the user of the STB 7; bid time and date 32c indicating the time and date of sending the bid price 32b. In the present embodiment, this IC card number 32a corresponds to the user ID.

Figure 3A:
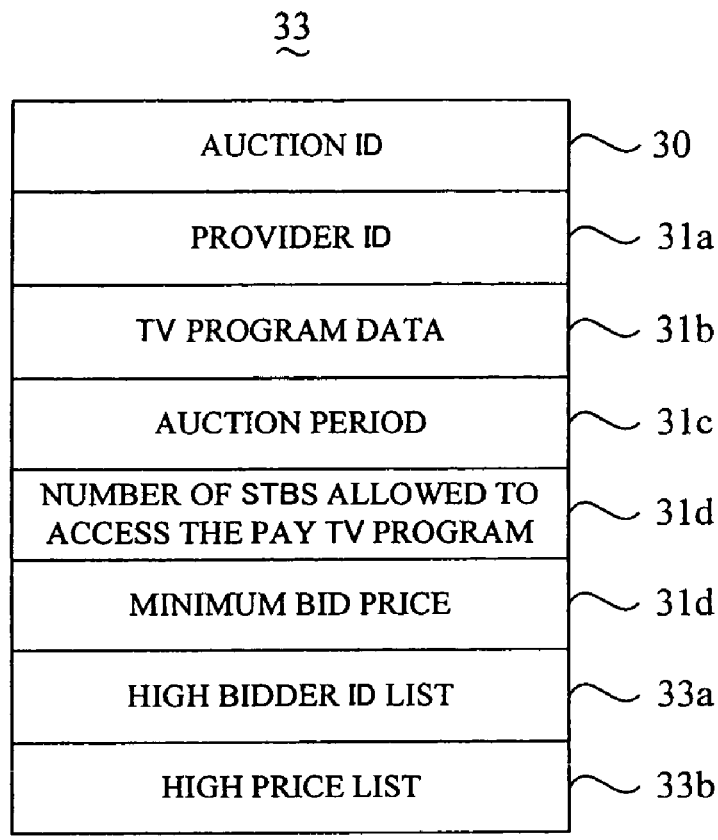

FIG. 3A is a table showing content of auction information 33 which includes, and is formed on the basis of, the auction TV program information 31 and the bid information 32. The auction management device 3 distributes the auction information 33 shown in FIG. 3A via the TV broadcast signal distribution device 2. The auction information 33 is formed by combining the auction TV program information 31 with a high bidder ID list 33a, which is a list of high bidders e.g. as made by sorting the bid prices in the bid information 32 in order from high to low, and with a high price list 33b which is a list of the bid prices of the bidders in the high bidder ID list 33a.

Figure 3B:
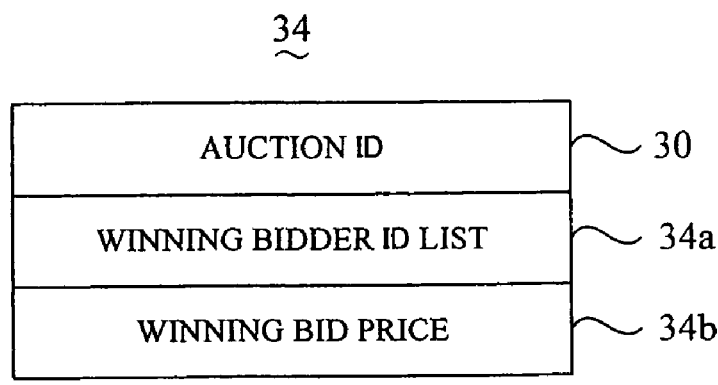
FIG. 3B is a table showing content of winning bid information.

When the winning bidders and the winning bid price of the pay TV program are determined by a later described auction process, the auction management device 3 sends winning bid information 34 shown in FIG. 3B to the TV broadcast signal distribution device 2, the account management device 4 and the conditional access management device 5. As shown in FIG. 3B, which is a table showing content of the winning bid information 34, the winning bid information 34 is information including e.g.: auction ID 30; a winning bidder ID list 34a which is a list of the winning bidders; and a winning bid price 34b.

The account management device 4 manages account information of the user of the STB 7 on the basis of the winning bidders and the winning bid price determined by the auction process of the auction management device 3, and charges the winning bidders of the pay TV program for the winning bid price. The charging is done on a so-called "pay-per-view" basis, in which the user is charged for TV programs actually accessed or viewed.

The conditional access management device 5 manages information on a viewing contract for the pay TV program (hereafter referred to as "viewing contract information"), and also manages e.g. a key for scrambling e.g. the pay TV program (this key being also used for descrambling as will be described later). Using e.g. related information such as ECM (Entitlement Control Message) and EMM (Entitlement Management Message) together with a Km (master key), the conditional access management device 5 restricts or prevents viewing of the pay TV program by users without the viewing contract, namely restricts such viewing to only users with the viewing contract. In the present embodiment, such related information corresponds to the conditional access information.

The ECM is information including Ks (scramble key) for scrambling the pay TV program and also including attribute information of the pay TV program (hereafter referred to as "program attribute information"). The EMM is information including the viewing contract information and Kw (work key) for encrypting the ECM. On the other hand, the Km (master key) is information for encrypting the EMM. Note that these ECM, EMM and Km are not necessarily required to be managed by one conditional access management device 5, but can be managed separately.

Figure 4:
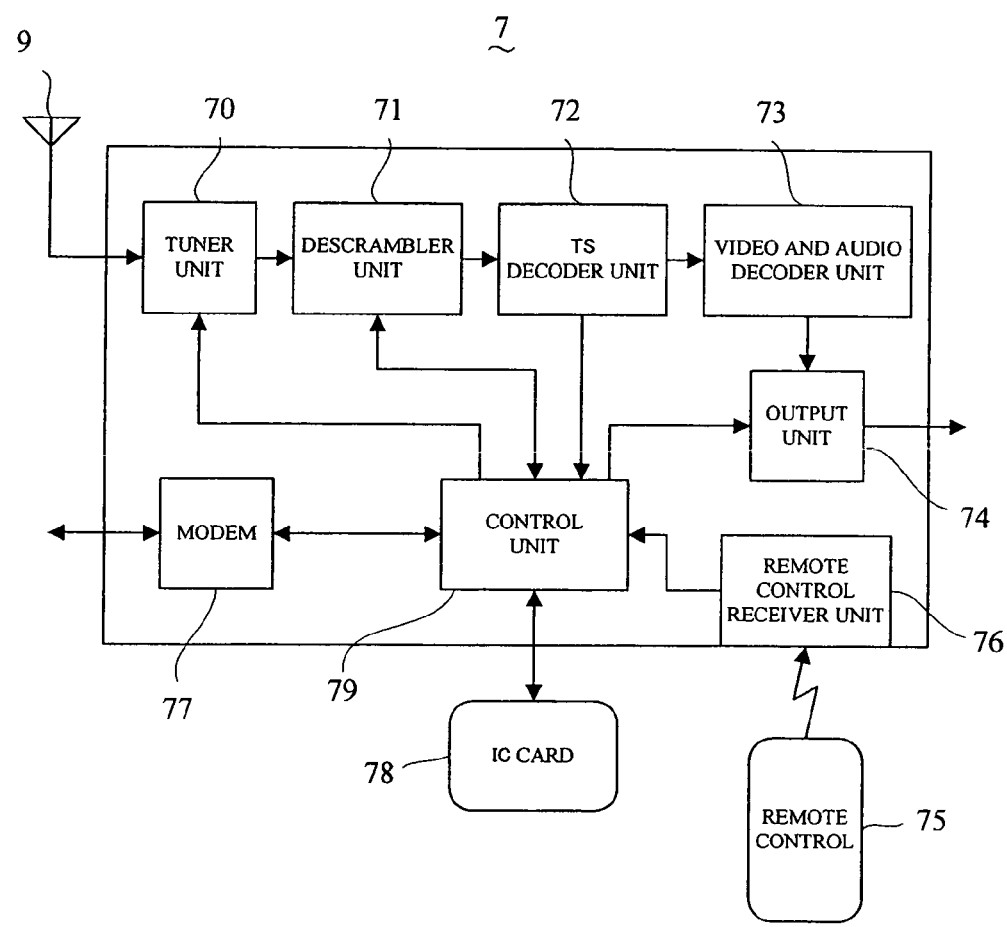
FIG. 4 is a schematic block diagram of an STB for receiving a pay TV program distributed from the TV program distribution system.

Hereinafter, the STB 7 will be described with reference to FIG. 4, which is a schematic block diagram of the STB 7. The STB 7 is a TV broadcast signal receiving device for receiving a. pay TV program scrambled and distributed from the TV program distribution system 1. The STB 7 comprises: a tuner unit (corresponding to a receiving circuit) 70 for receiving, as DTV broadcast signals, the scrambled pay TV program with other information; and a descrambler unit 71 for descrambling the scrambled pay TV program received by the tuner unit 70. More specifically, when the STB 7 wins the bid for the viewing right of the pay TV program, the tuner unit 70 receives conditional access information for descrambling the scrambled pay TV program, wherein using the received conditional access information, the descrambler unit 71 descrambles the scrambled pay TV program.

The STB 7 further comprises: video and audio decoder unit 73 for decoding video and audio signals of the pay TV program descrambled by the descrambler unit 71; an output unit (output circuit) 74 for outputting, to a display or monitor device (monitor device 10 in FIG. 1), the video and audio signals decoded by the video and audio decoder unit 73; a remote control (corresponding to an information input device) 75 for inputting predetermined information to be sent from the STB 7 to the TV program distribution system 1; and a modem (corresponding to a sending circuit) 77 for sending, to the TV program distribution system 1, the information input using the remote control 75. More specifically, when a bid price of the pay TV program is input using the remote control 75, the modem 77 sends, to the TV program distribution system 1, a user ID (Identification) for identifying the user of the STB 7, and bid information including information on the bid price.

The tuner unit 70 receives, at any time or as needed, the auction information 33 which includes the auction TV program information 31 and the bid information 32, and which is distributed from the TV program distribution system 1. The output unit 74 outputs the received auction information 33 to the display or monitor device. Furthermore, the tuner unit 70 receives the winning bid information 34 of the pay TV program which is distributed from the TV program distribution system 1, and which includes information on the winning bidder ID list 34a (list of the winning bidders) and the winning bid price 34b. The output unit 74 outputs the received winning bid information to the display or monitor device.

The STB 7 still further comprises a TS (Transport Stream) decoder unit 72, a remote control receiver unit 76, an IC card 78, a control unit 79, and so on. Each unit or device will be described in detail below.

The tuner unit 70 selects signals on an assigned frequency, and demodulates and corrects TV broadcast signals, outputting TS packets, which are scrambled. The descrambler unit 71 descrambles the scrambled TS packets which are multiplexed signals containing the pay TV program. The TS decoder unit 2 separates necessary TS packets from the multiplexed signals, and sends such necessary TS packets to respective units or devices including the video and audio decoder unit 73 and the control unit 79 in the STB 7.

The video and audio decoder unit 73 decodes video and audio streams separated by the TS decoder unit 2. The output unit 74 outputs the thus decoded video and audio signals to the monitor device 10, and provides a user interface for displaying, on the monitor device 10, the auction information 33 which is necessary for the user to participate in the auction.

The remote control 75 has keys to be operated by the user such as numerical keys, a cursor key and a decision key, and sends key control signals to the remote control receiver unit 76 according to the respective operation of each key. The remote control receiver unit 76 receives the key control signals from the remote control 75, and sends them to the control unit 79. The modem 77 is connected to the auction management device 3 via the communication line 8, and is used to communicate between the STB 7 and the auction management device 3.

The IC card 78 communicates to and from the control unit 70 to perform processes such as decryption of the encrypted EMM and ECM and viewing control of a pay TV program. The control unit 79 controls the entire STB 7, including control of the communication with the IC card 78 and of the descrambler unit 71 at the time of receiving a pay TV program.

The following describes a conditional access system or method to restrict or prevent viewing of a pay TV program by an STB 7 without a viewing contract for the pay TV program, namely restrict such viewing only to each STB 7 with a viewing contract. The TV broadcast signal distribution device 2 multiplexes the following three information into TV broadcast signals for distribution: a pay TV program scrambled using the Ks; the ECM encrypted using the Kw; and the EMM encrypted using the Km.

On the other hand, the STB 7 receives and transfers the encrypted EMM to the IC card 78. Using Km pre-stored in the IC card 78, the IC card 78 decrypts the encrypted EMM so as to obtain the Kw and viewing contract information, which are then stored in the IC card 78. When the STB 7 receives the pay TV program, the STB 7 also receives the encrypted ECM distributed along with the pay TV program, and transfers the encrypted ECM to the IC card 78. Using Kw pre-stored in the IC card 78, the IC card 78 decrypts the encrypted ECM so as to obtain the Ks and program attribute information. The STB 7 compares the program attribute information with the viewing contract information stored in the IC card 78, and determines whether or not to descramble the scrambled pay TV program. The STB 7 descrambles the scrambled pay TV program using the Ks in the case where the STB 7 determines that the STB 7 is in the viewing contract, i.e. only if the user has the viewing contract for the pay TV program.

Figure 5:
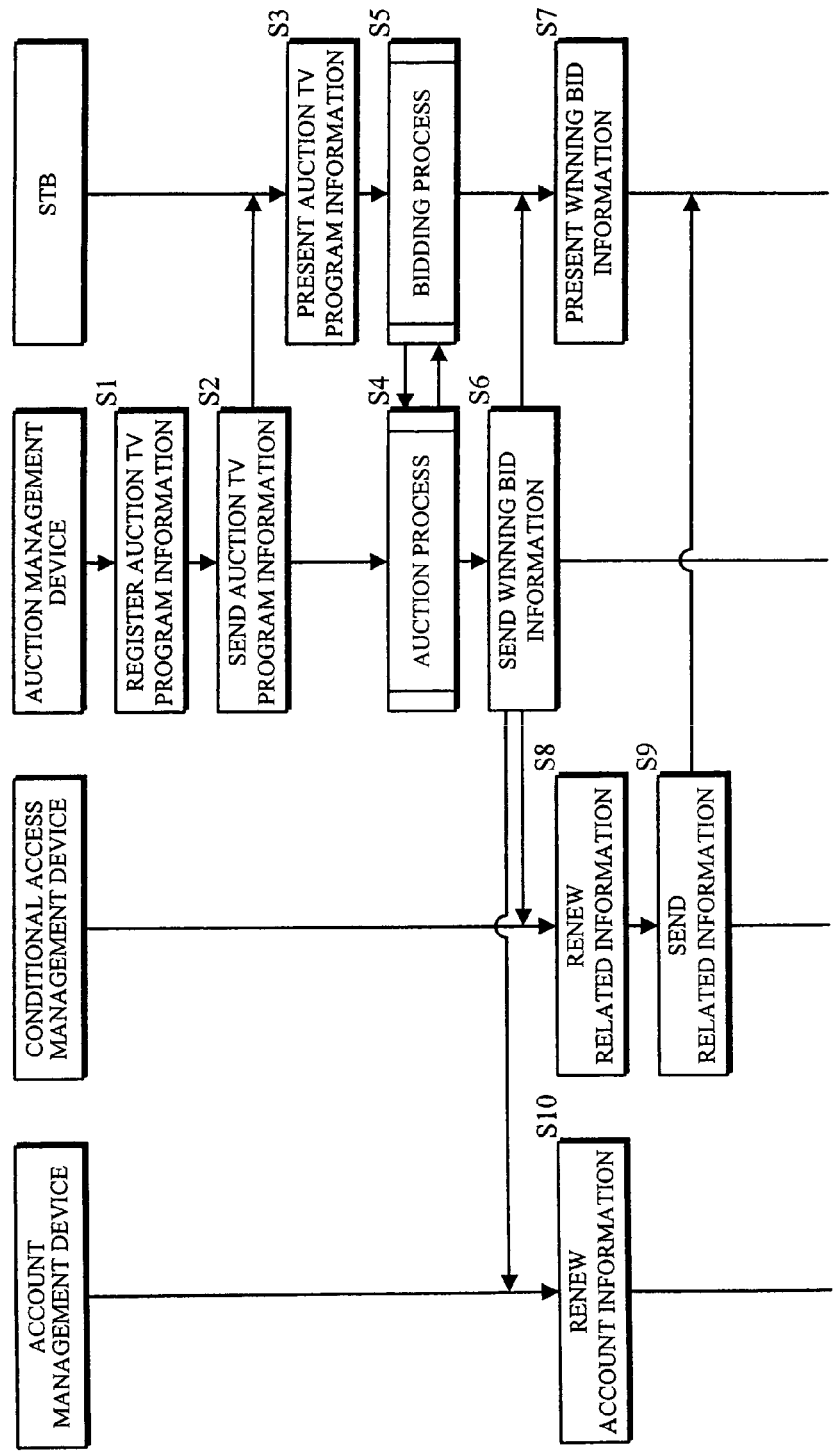
FIG. 5 is a flow chart showing a process in and between the TV program distribution system and the STB.
Figure 6:
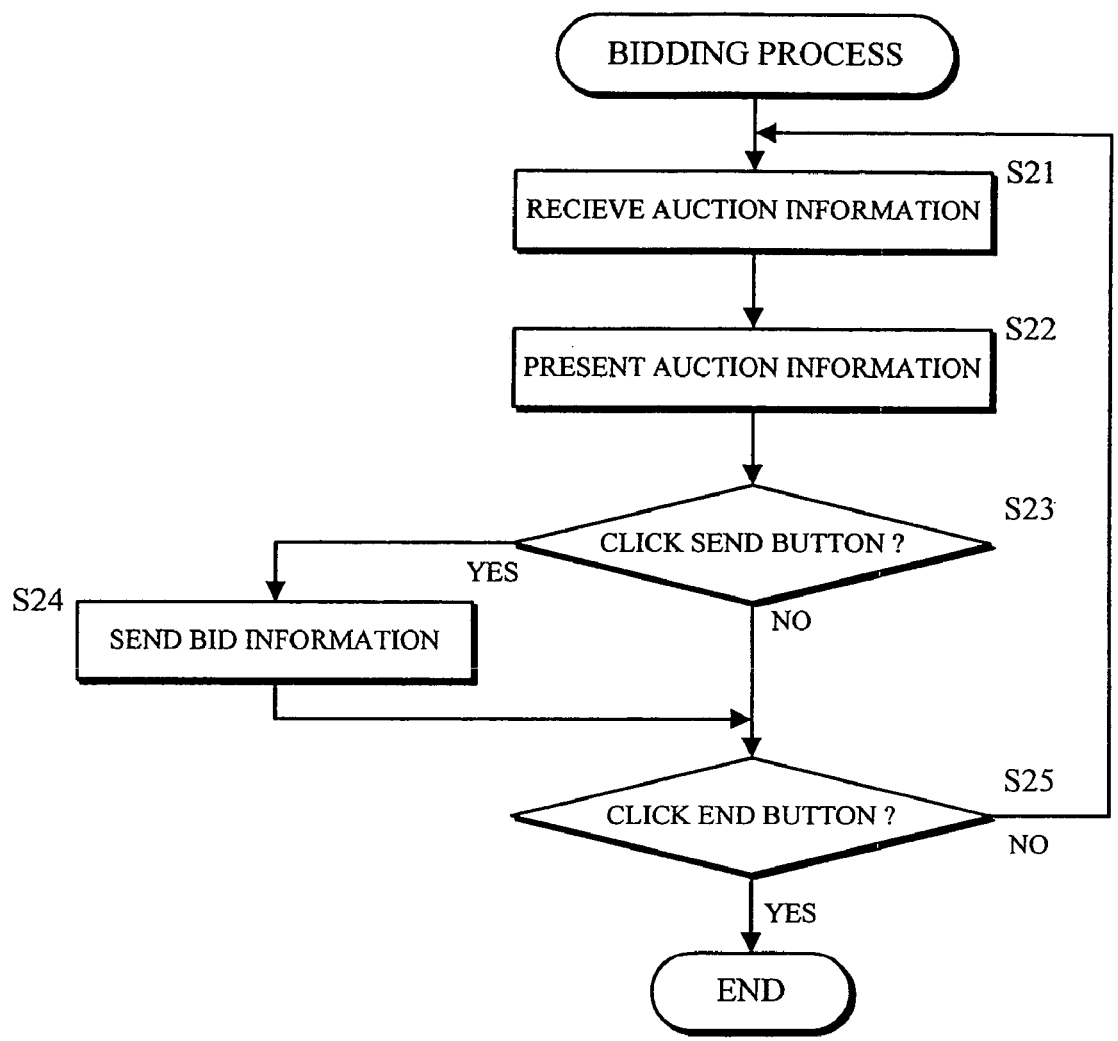
FIG. 6 is a flow chart showing a bidding process performed by the STB.
Figure 7:
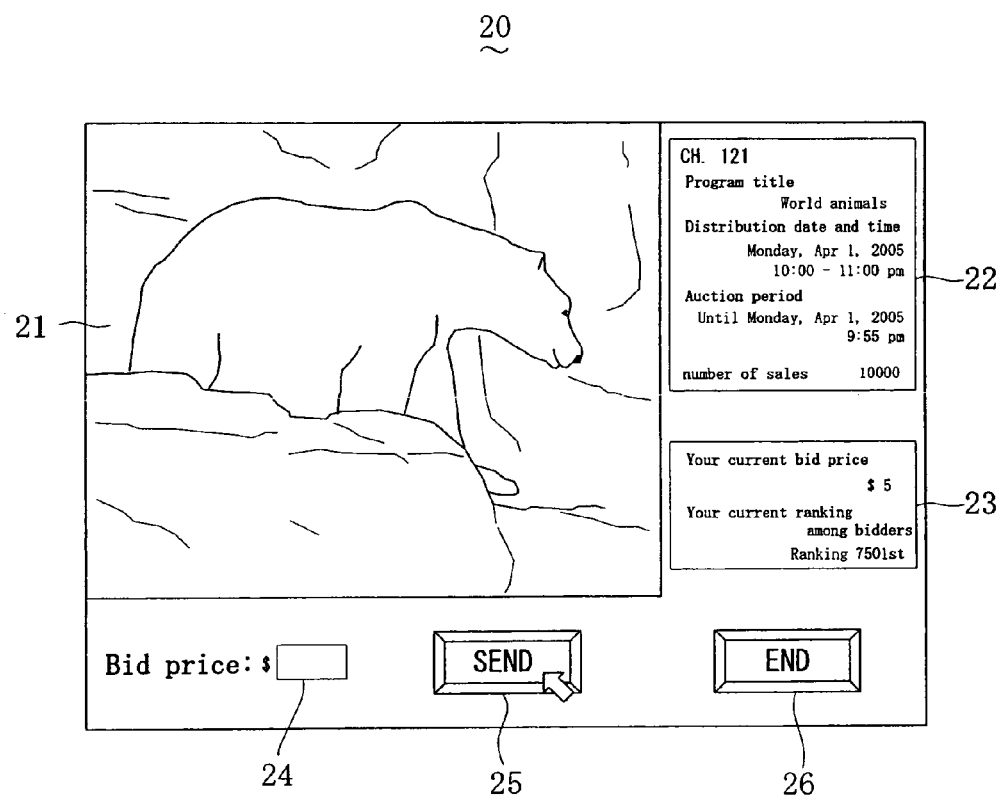
FIG. 7 is a schematic view of a bidding screen presented to a user.
Figure 8:
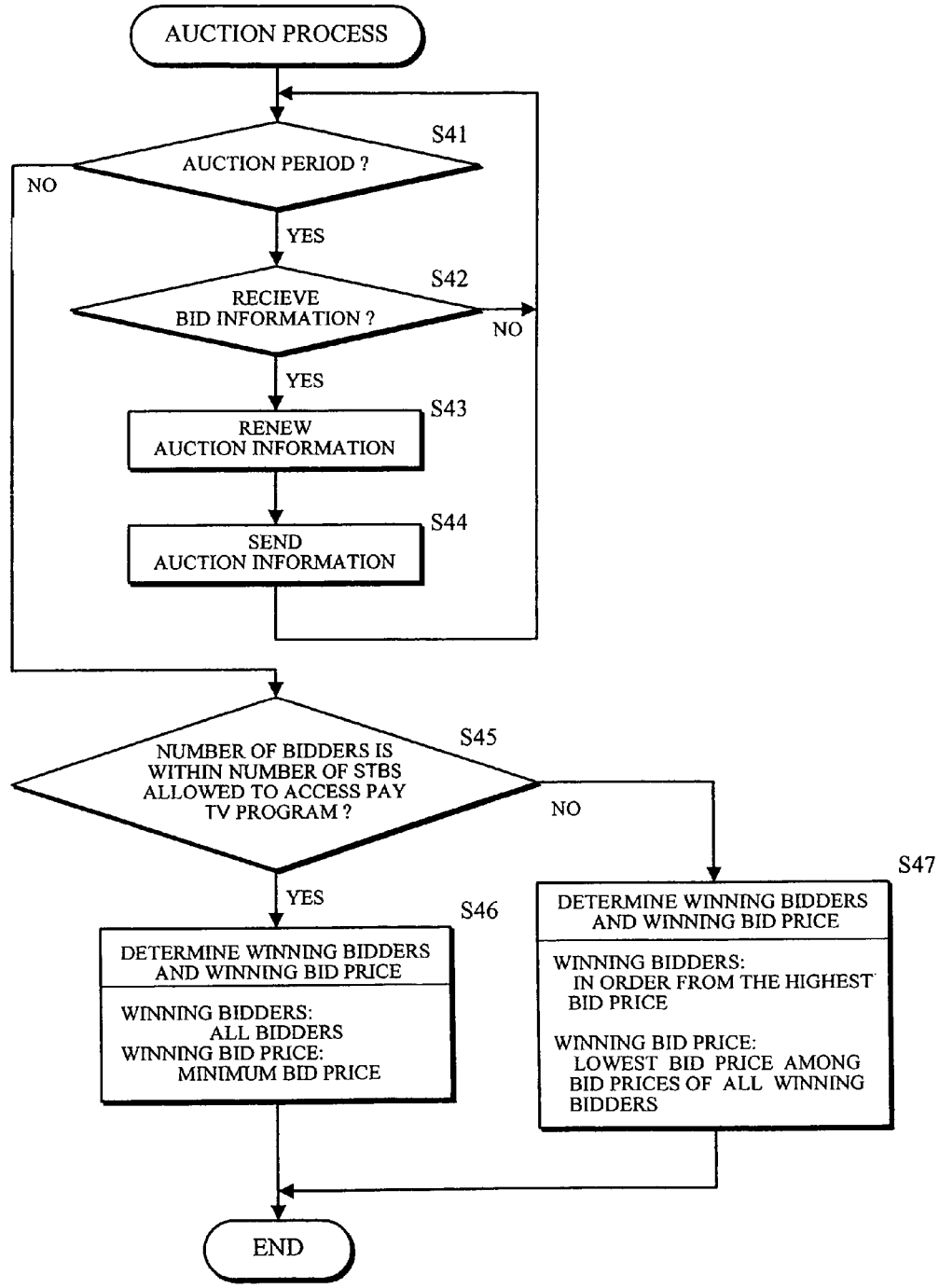
FIG. 8 is a flow chart showing an auction process performed by an auction management device in the TV program distribution system.

Referring to FIG. 5 to FIG. 8, processes performed in and between the TV program distribution system 1 and the STB 7 will be described. FIG. 5 is a flow chart showing an entire process in and between the TV program distribution system 1 and the STB 7. FIG. 6 is a flow chart showing a bidding process performed by the STB 7, while FIG. 7 is a schematic view of a bidding screen 20 presented to the user on the monitor device of the STB 7. FIG. 8 is a flow chart showing an auction process performed by the auction management device 3 in the TV program distribution system 1.

Referring to FIG. 5, a TV program provider wishing to sell the viewing right of a pay TV program by auction registers auction TV program information 31 on such pay TV program to the auction management device 3 (S1). The auction TV program information 31 is sent from the auction management device 3 to the TV broadcast signal distribution device 2, and is multiplexed, for distribution, with other information sources by the TV broadcast signal distribution device 2 (S2).

The STB 7 receives and presents the auction TV program information 31 to the user so as to notify, to the user, information on an outline of the pay TV program, predetermined number of TV STBs 7 (viewers) allowed to access the pay TV program, predetermined minimum bid price and so on (S3). Based on the auction TV program information 31, the auction management device 3 starts an auction process on an auction start date and time (S4), and the STB 7 starts a bidding process according to the operation of the user (S5).

Referring to FIG. 6, which shows the bidding process performed by the STB 7, the STB 7 receives TV broadcast signals containing auction information 33 (S21), and extracts the auction information 33 from the received TV broadcast signals. The output unit 74 processes the extracted auction information 33 so as to present the auction information 33 to the user (S22).

Referring now to FIG. 7, which shows the bidding screen 20 presented to the user on the monitor device of the STB 7 for the bidding process, the bidding screen 20 comprises: a sample image area 21 for displaying a sample image of the pay TV program for auction, namely auction TV program; a TV program information display area 22 for displaying information on the TV program such as program title, distribution date and time, auction period and predetermined number of STBs 7 allowed to access the TV program; a bid information display area 23 for displaying e.g. bid information on users already registered in the auction management device 3; a price input area 24 for the user to input a bid price to be newly sent to the auction management device 3; a send button 25 to be clicked for sending the bid price, input in the price input area 24, to the auction management device 3; and an end button 26 to be clicked for ending the bidding process. Note that the bid information display area 23 according to the present embodiment is designed to display only the bid information on the user itself, but can be designed to display bid information e.g. on high bidders.

Referring back to FIG. 6, the STB 7 determines whether the send button 25 is clicked after the user inputs the bid price (S23). When the send button 25 is clicked (YES in S23), the STB 7 sends bid information 32 to the auction management device 3 (S24). After the bid information 32 is sent in step S24, or if the send button 25 is not clicked in step S23 (NO in S23), the STB 7 determines whether or not the end button 26 is clicked (S25). If the end button 26 is not clicked (NO in S25), the STB 7 continues the bidding process, and receives auction information 33 (S21) so as to present newest auction information 33 to the user (S22). If the end button 26 is clicked (YES in S25), the STB 7 ends the bidding process.

Referring now to FIG. 8, which is a flow chart showing an auction process performed by the auction management device 3 in the TV program distribution system 1, the auction management device 3 determines whether or not the pay TV program for auction is within the auction period (S41). If it is within the auction period (YES in S41), the auction management device 3 determines whether or not it has received bid information 32 (S42). When the auction management device 3 receives bid information 32 (YES in S42), the auction management device 3 renews the auction information 33 stored in the auction management device 3 (S43), and distributes the renewed auction information 33 via the TV broadcast signal distribution device 2 (S44).

When the auction period ends (NO in S41), the auction management device 3 determines, for determining winning bidders and a winning bid price of the pay TV program, whether or not the number of bidders is within the predetermined number of STBs allowed to access the pay TV program (S45). If the number of bidders in the auction period is within the predetermined number of STBs allowed to access the pay TV program, namely that the number of bidders does not reach the predetermined number of STBs allowed to access the pay TV program in the auction period (YES in S45), the auction management device 3 determines all the bidders as winning bidders and the predetermined minimum price (set e.g. by the TV program provider) as a winning bid price for all the winning bidders (S46). Thus, the TV program distribution system 1 distributes the pay TV program to all the bidders at the minimum bid price.

On the other hand, if the number of bidders in the auction period exceeds the predetermined number of STBs allowed to access the pay TV program (NO in S45), the auction management device 3 determines that the number of bidders, which corresponds to the predetermined number of STBs allowed to access the pay TV program, and which is chosen in order from the highest bid price, are winning bidders, and further determines that the lowest bid price among the bid prices of all the winning bidders is a winning bid price for all the winning bidders (S47). Thus, the TV program distribution system 1 distributes the pay TV program to all the winning bidders at the lowest bid price among the bid prices of all the winning bidders. Then, a viewing contract of the pay TV program is established between the TV program provider and each of the winning bidders upon ending of the auction process.

Referring back to FIG. 5, the process in and between the TV program distribution system 1 and the STB 7, after the end of the auction, will be described. After the end of the auction, the auction management device 3 sends the winning bid information 34 to the TV broadcast signal distribution device 2, the account management device 4 and the conditional access management device 5 (S6). The TV broadcast signal distribution device 2 multiplexes the winning bid information 34, sent thereto, into TV broadcast signals for distribution. The STB 7 extracts the winning bid information 34 from the TV broadcast signals received thereby, and presents the winning bid information 34 to the user (S7). The conditional access management device 5 receives the winning bid information 34, and renews related information on the basis of the winning bid information 34 (S8), and further sends the renewed related information to the STB 7 via the TV broadcast signal distribution device 2 (S9). Based on the winning bid information 34, the accounting management device 4 renews account information, and charges the winning bidders for the winning bid price (S10).

As described in the foregoing, the TV program distribution system 1 according to the present embodiment makes it possible for a TV program provider to collect fees of a pay TV program according to market value of the pay TV program, because the TV program distribute system 1 sells the pay TV program by auction, limiting the number of STBs 7 allowed to access the pay TV program. The STB 7, or more specifically a user of the STB 7 which is a TV broadcast signal receiving device for receiving the pay TV program distributed from the TV program distribution system 1, can participate and bid in the auction of the pay TV program, using the STB 7. Accordingly, the user can establish a viewing contract with the TV program provider at a price according to the extent that the user wishes to view.

It is to be noted that the present invention is not limited to the structure, configuration or process of the above embodiment, and various modifications are possible. For example, the service environment in which the TV program distribution system 1 according to the above embodiment is applied can be VoD (Video on Demand) type or server (storage) type broadcast. In the case of the server type broadcast, the STB 7 is to be provided with a hard disk for storing TV programs. Furthermore, the frequency of selling one same TV program is not necessarily limited to once. For example, it is possible to sell one pay TV program stepwise such that at a predetermined time after the pay TV program is sold and distributed once, the pay TV program is again sold and distributed.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A TV (television) program distribution system for distributing a pay TV program provided by a TV program provider to TV broadcast signal receiving devices, limiting number of TV broadcast signal receiving devices allowed to access the pay TV program, the TV program distribution system comprising:

a TV broadcast signal distribution device for scrambling the pay TV program, and for multiplexing the pay TV program with other information into DTV (Digital Television) broadcast signals for distribution;

an auction management device for managing selling, by auction, of viewing right of the pay TV program;

an account management device for charging winning bidders of the pay TV program determined by the auction; and a conditional access management device for managing conditional access information to make it possible for each TV broadcast receiving device of each winning bidder of the pay TV program to descramble the scrambled pay TV program, wherein prior to the distribution of the pay TV program, the TV broadcast signal distribution device distributes auction TV program information including information on an outline of the pay TV program, predetermined number of TV broadcast signal receiving devices allowed to access the pay TV program, auction period and predetermined minimum bid price, wherein the auction management device receives a user ID (Identification) for identifying the user of the TV broadcast signal receiving device and bid information including information on a bid price, which are sent from each TV broadcast signal receiving device, and further sums up received plural bid information so as to determine winning bidders and a winning bid price of the pay TV program, wherein when the number of bidders in the auction period is within the predetermined number of TV broadcast signal receiving devices allowed to access the pay TV program, the auction management device determines all the bidders as the winning bidders and the predetermined minimum price as the winning bid price for all the winning bidders, wherein when the number of bidders in the auction period exceeds the predetermined number of TV broadcast signal receiving devices allowed to access the pay TV program, the TV program distribution system determines that the number of bidders, which corresponds to the predetermined number of TV broadcast signal receiving devices allowed to access the pay TV program, and which is chosen in order from the highest bid price, are winning bidders, in which the TV program distribution system distributes the pay TV program to all the winning bidders at the lowest bid price among bid prices of all the winning bidders, and wherein when the winning bidders of the pay TV program are determined, the TV broadcast signal distribution device distributes, to each winning bidder of the pay TV program, the conditional access information of the pay TV program managed by the conditional access management device.

2. The TV program distribution system according to claim 1, wherein for determining the winning bidders and the winning bid price of the pay TV program, the auction management device determines whether or not the number of bidders is within the predetermined number of TV broadcast signal receiving devices allowed to access the pay TV program.

3. The TV broadcast signal distribution system according to claim 2, wherein during the auction period, the TV broadcast signal distribution device distributes auction information including information on the auction TV program and the bid information already received by the auction management device.

4. The TV broadcast signal distribution system according to claim 3, wherein the TV broadcast signal distribution device distributes winning bid information including information on the winning bidders and the winning bid price of the pay TV program.

5. A TV (television) broadcast signal receiving device for receiving a pay TV program which is distributed from a TV program distribution system, and viewing right of which is sold by auction, the TV broadcast signal receiving device comprising:

a receiving circuit for receiving a scrambled pay TV program with other information as DTV (Digital Television) broadcast signals;

a descrambler unit for descrambling the scrambled pay TV program received by the receiving circuit;

a decoder unit for decoding video and audio signals of the pay TV program descrambled by the descrambler unit;

an output circuit for outputting, to a display device, the video and audio signals decoded by the decoder unit;

an information input device for inputting predetermined information to be sent from the TV broadcast signal receiving device to the TV program distribution system; and a sending circuit for sending, to the TV program distribution system, the information input using the information input device, wherein the receiving circuit receives auction TV program information which is distributed from the TV broadcast signal distribution device prior to the distribution of the pay TV program, and which includes information on an outline of the pay TV program, predetermined number of TV broadcast signal receiving devices allowed to access the pay TV program, auction period and predetermined minimum bid price, wherein the output circuit outputs the received auction TV program information to the display device, wherein when a bid price of the pay TV program is input using the information input device, the sending circuit sends, to the TV program distribution system, a user ID (Identification) for identifying the user of the TV broadcast receiving device and bid information including information on the bid price, wherein when the TV broadcast signal receiving device wins the bid for the viewing right of the pay TV program, the receiving circuit receives conditional access information for descrambling the scrambled pay TV program, wherein using the received conditional access information, the descrambler unit descrambles the scrambled pay TV program, wherein when the number of bidders in the auction period is within the predetermined number of TV broadcast signal receiving devices allowed to access the pay TV program, all the bidders are the winning bidders and the predetermined minimum price is the winning bid price for all the winning bidders, and wherein when the number of bidders in the auction period exceeds the predetermined number of TV broadcast signal receiving devices allowed to access the pay TV program, the TV program distribution system determines that the number of bidders, which corresponds to the predetermined number of TV broadcast signal receiving devices allowed to access the pay TV program, and which is chosen in order from the highest bid price, are winning bidders, in which the TV program distribution system distributes the pay TV program to all the winning bidders at the lowest bid price among bid prices of all the winning bidders.

6. The TV broadcast signal receiving device according to claim 5, wherein the receiving circuit receives, as needed, auction information which includes the auction TV program information and the bid information, and which is distributed from the TV program distribution system, while the output circuit outputs the received auction information to the display device.

7. The TV broadcast signal receiving device according to claim 6, wherein the receiving circuit receives winning bid information of the pay TV program which is distributed from the TV program distribution system, and which includes information on winning bidders and a winning bid price, while the output circuit outputs the received winning bid information to the display device.

* * * * *